(12) United States Patent
Zuritis

(10) Patent No.: US 10,992,251 B2
(45) Date of Patent: Apr. 27, 2021

(54) INTEGRATED BONDING MID CLAMP DEVICE, SYSTEM, AND METHOD FOR SOLAR PANEL MOUNTING AND GROUNDING

(71) Applicant: SOLAR FOUNDATIONS USA, INC., New Castle, DE (US)

(72) Inventor: Michael Zuritis, Ballston Lake, NY (US)

(73) Assignee: SOLAR FOUNDATIONS USA, INC., New Castle, DE (US)

( * ) Notice: Subject to any disclaimer, the term of this patent is extended or adjusted under 35 U.S.C. 154(b) by 275 days.

(21) Appl. No.: 15/959,478

(22) Filed: Apr. 23, 2018

(65) Prior Publication Data
US 2019/0326847 A1  Oct. 24, 2019

(51) Int. Cl.
| H02S 20/20 | (2014.01) |
| F16B 2/06 | (2006.01) |
| F16B 5/06 | (2006.01) |
| F16B 43/00 | (2006.01) |
| F16B 39/00 | (2006.01) |

(52) U.S. Cl.
CPC .............. *H02S 20/20* (2014.12); *F16B 2/065* (2013.01); *F16B 5/0685* (2013.01); *F16B 43/00* (2013.01); *F16B 39/00* (2013.01)

(58) Field of Classification Search
CPC . H02S 30/10; F24S 25/20; F24S 25/63; F24S 25/634; F24S 25/67; F24S 2025/6003; F24S 25/636
See application file for complete search history.

(56) References Cited

U.S. PATENT DOCUMENTS

| 9,643,230 B2 * | 5/2017 | Andrews ................... H01R 4/62 |
| 2011/0179606 A1 * | 7/2011 | Magno, Jr. ............ F24S 25/636 24/457 |

* cited by examiner

*Primary Examiner* — Daniel P Malley, Jr.
(74) *Attorney, Agent, or Firm* — Schmeiser, Olsen & Watts, LLP

(57) ABSTRACT

Disclosed herein is an integrated bonding mid clamp device for solar panel mounting and grounding, as well as a related system and method. The integrated bonding mid clamp includes a deformable toothed washer for breaking an anodized layer of a solar panel frame. The deformable toothed washer is capable of deforming to avoid obstructing proper contact between the mid clamp and the solar panel frame.

17 Claims, 14 Drawing Sheets

US 10,992,251 B2

INTEGRATED BONDING MID CLAMP DEVICE, SYSTEM, AND METHOD FOR SOLAR PANEL MOUNTING AND GROUNDING

FIELD OF THE INVENTION

The subject matter disclosed herein relates generally to solar arrays and methods of mounting and grounding the same. More particularly, the subject matter relates to an integrated bonding mid clamp providing contact between a panel frame and a grounding path. A related system and method is also disclosed.

BACKGROUND OF THE INVENTION

Renewable energy sources are becoming more popular with the rising cost of oil and other non-renewable energy resources. Solar energy is one of these renewable energy sources, and has proven desirable to harness in many circumstances. One method of harnessing solar energy is to install a structural array of solar panels, or a solar array, such that the solar panels each face the sun to achieve sunlight absorption.

In order to comply with the National Electrical Code (NEC) and other safety regulations, the solar panels and solar arrays must be properly grounded. Typically, solar panels are grounded by attachment to an equipment grounding conductor, such as a heavy gauge copper wire or the like. Solar panels are often surrounded by an aluminum frame having an anodized layer. In many cases, the ground path runs through this anodized aluminum frame, into a support rail, and then into the copper wire or the like. The anodized layer is insulative; therefore when the ground path runs through the anodized aluminum frame, the anodized layer of the frame must be broken to allow electricity to be conducted. Other components, for example, a support rail, may also have an anodized layer. The anodized layer of the support rail may also need to be removed before the ground path runs through the support rail.

Improved mid clamps capable of scratching or otherwise breaking the anodized layer of the panel frame and providing increased contact area between the mid clamp and the solar panel frames would be well received in the art.

BRIEF DESCRIPTION OF THE INVENTION

According to one aspect, an integrated bonding mid clamp device for use with a solar panel array comprises a mid clamp portion having a recessed area, the recessed area having a perimeter and a depth; a deformable toothed washer configured to fit within the perimeter of the recessed area, wherein the deformable toothed washer has projections that extend past the depth of the recessed area when the deformable toothed washer is in a non-deformed state; and a tightening mechanism configured to clamp the mid clamp portion to at least one solar panel frame; wherein the deformable toothed washer is configured to deform such that at least one of the projections does not extend past the depth of the recessed area of the mid clamp portion when the tightening mechanism clamps the mid clamp portion to the at least one solar panel frame.

According to another aspect, a solar panel attachment system comprises a solar panel having a solar panel frame, wherein the solar panel frame has an anodized layer; a support rail configured to support the solar panel and the solar panel frame, wherein the support rail has a channel; and an integrated bonding mid clamp device, the integrated mid clamp device comprising: a mid clamp portion with a recessed area and a mid clamp hole; a deformable toothed washer comprising a round washer hole surrounded by projections, wherein the deformable toothed washer is configured to reside within the recessed area so that only the projections extend from the recessed area when the deformable toothed washer is in a non-deformed state; a bolt portion having a bolt head and a threaded shaft, wherein the bolt head is configured to be retained by the channel of the support rail and the threaded shaft is configured to pass through the washer hole and the mid clamp hole; and a lock nut configured to threadably attach to the threaded shaft after the threaded shaft has passed through the washer hole and the mid clamp hole, wherein the lock nut and the clamp portion move toward the bolt head as the lock nut is tightened; wherein tightening of the lock nut secures the solar panel frame to the support rail using the integrated bonding mid clamp device; wherein tightening of the lock nut causes the projections of the deformable toothed washer to break the anodized layer of the solar panel frame; and further wherein tightening of the lock nut causes the deformable toothed washer to transition into a deformed state in which at least one of the projections no longer extends from the recessed area.

According to another aspect, a method of clamping at least one solar panel frame to a support rail, wherein the method of clamping also breaks an anodized layer of at least one solar panel frame, comprises providing a support rail having a channel; providing at least one solar panel frame having an anodized layer; positioning the at least one solar panel frame so that the at least one solar panel frame has a surface that is substantially perpendicular to the support rail; providing a clamping device, the clamping device comprising: a mid clamp portion with a recessed area and a mid clamp hole; a deformable toothed washer comprising a round washer hole surrounded by projections, wherein the deformable toothed washer is configured to reside within the recessed area so that the projections extend from the recessed area when the deformable toothed washer is in a non-deformed state; a bolt portion having a bolt head and a threaded shaft; and a lock nut configured to threadably attach to the threaded shaft; inserting the bolt head into the channel of the support rail; passing the threaded shaft through the round washer hole and the mid clamp hole; tightening the lock nut on to the threaded shaft to clamp the at least one solar panel frame between the mid clamp portion and the support rail; wherein tightening the lock nut causes the projections of the deformable toothed washer to break the anodized layer of the at least one solar panel frame; and further wherein tightening the lock nut causes the deformable toothed washer to transition into a deformed state in which at least one of the projections no longer extends from the recessed area.

BRIEF DESCRIPTION OF THE DRAWINGS

The subject matter which is regarded as the invention is particularly pointed out and distinctly claimed in the claims at the conclusion of the specification. The foregoing and other features and advantages of the invention are apparent from the following detailed description taken in conjunction with the accompanying drawings in which:

DETAILED DESCRIPTION OF THE INVENTION

A detailed description of the hereinafter described embodiments of the disclosed apparatus and method are presented herein by way of exemplification and not limitation with reference to the Figures.

Figure 1:
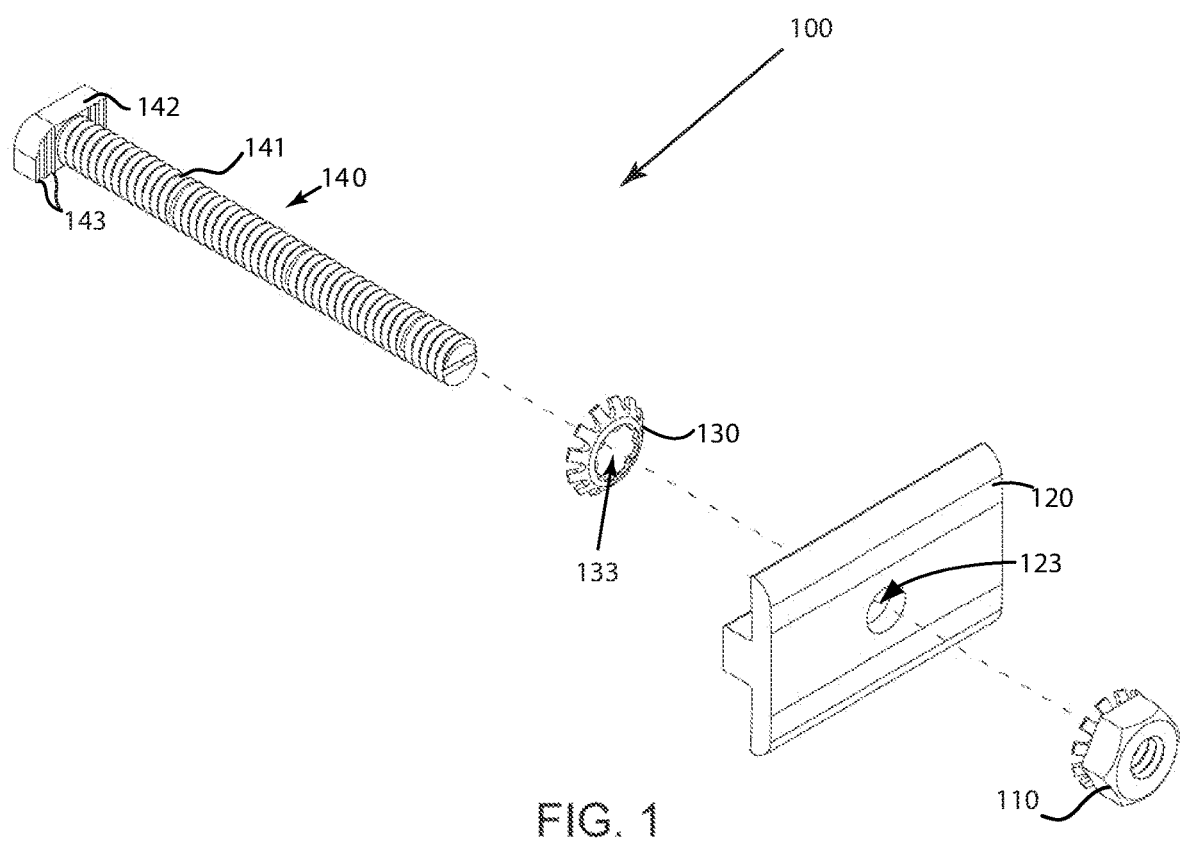
FIG. 1 depicts an exploded view of an integrated bonding mid clamp in accordance with one embodiment.

Referring firstly to FIG. 1, components of an integrated bonding mid clamp 100 according to one embodiment are shown in an exploded or unassembled state. The integrated bonding mid clamp may comprise a lock nut 110, a mid clamp portion 120, a deformable toothed washer 130, and a bolt portion 140. The lock nut 110, mid clamp portion 120, deformable toothed washer 130, and bolt portion 140 may all be made of conductive materials in one embodiment. Stainless steel, aluminum, and the like may be used for these components. For example, in one embodiment the lock nut 110, deformable toothed washer 130, and bolt portion 140 may be made of stainless steel or the like, while the mid clamp portion 120 is made of aluminum. The deformable toothed washer 130 is shown in a non-deformed state in accordance with one embodiment of the invention.

Figure 2:
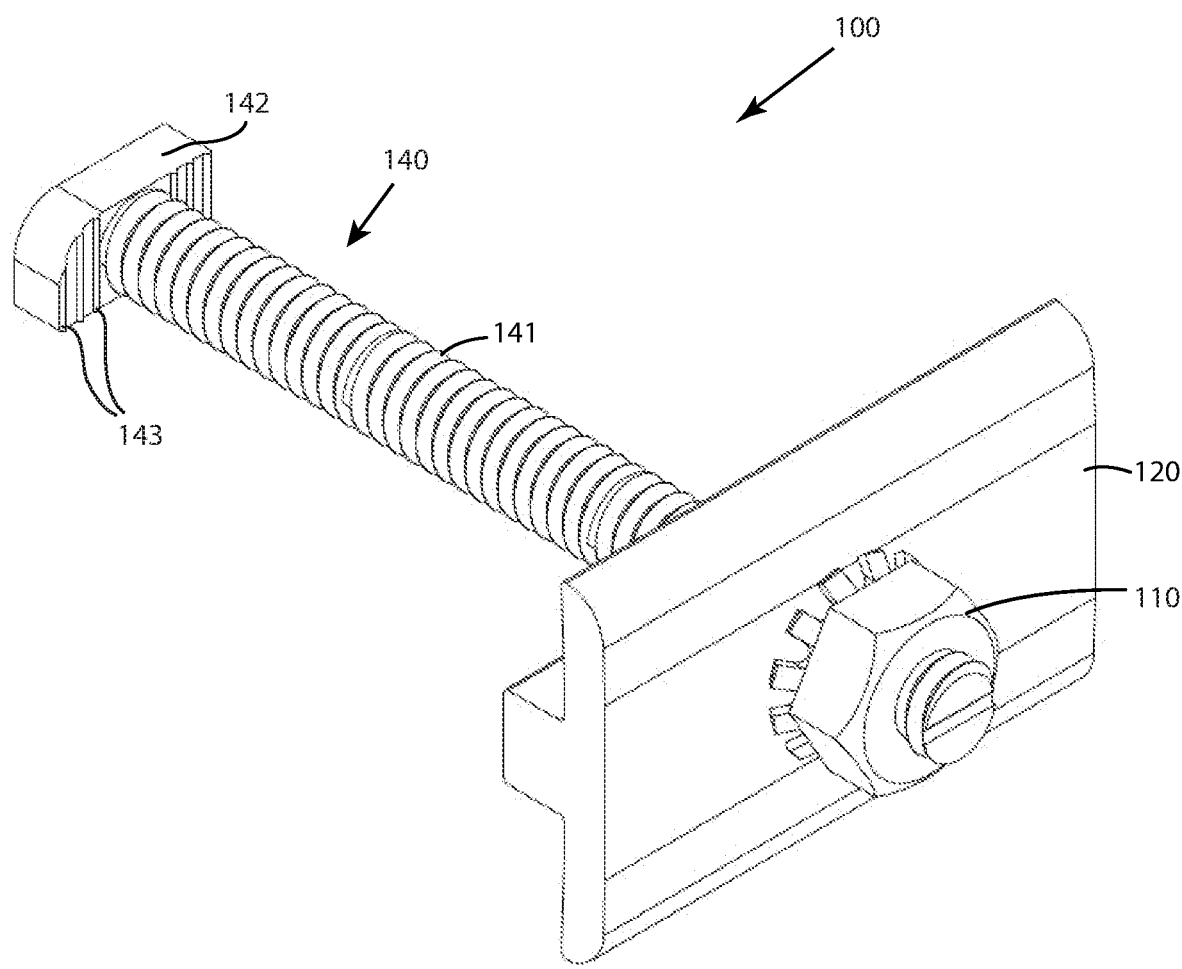
FIG. 2 depicts an assembled view of the integrated bonding mid clamp of FIG. 1 in accordance with one embodiment.

FIG. 2 depicts the integrated bonding mid clamp 100 in an assembled state according to one embodiment. The bolt portion 140 may extend through the deformable toothed washer 130 and through the mid clamp portion 120. The lock nut 110 may secure the mid clamp portion 120 to the bolt portion 140.

As will be described in more detail, the integrated bonding mid clamp 100 may be used to fasten one or more solar panel frames, such as solar panel frames 200a, 200b, to a support rail 400 as shown in FIGS. 5A-5E. In one embodiment, the solar panel frames 200a, 200b may be made of aluminum, steel, or like materials capable of conducting electricity. The solar panel frames 200a, 200b may include an anodized layer (not shown). The anodized layer may provide an insulating layer on the conductive material of the solar panel frame 200a, 200b. Like the solar panel frames 200a, 200b, the support rail 400 may be made of aluminum, steel, or like materials capable of conducting electricity. The support rail 400 may also have an anodized layer (not shown).

Referring still to FIGS. 5A-5E, the integrated bonding mid clamp 100 is shown used to fastening the solar panel frames 200a, 200b to the support rail 400. As shown in these Figures, the support rail 400 may include a channel 401. The channel 401 may be configured to receive one or more components of the integrated bonding mid clamp 100. On either side of the channel 401, the support rail 400 may include raised walls 402. In one embodiment, the solar panel frames 200 may rest on the raised walls 402 as shown in FIGS. 5B-5E. The solar panel frames 200 may be separated by a space, such as the space 250 shown in FIGS. 5C-5E.

Figure 3A:
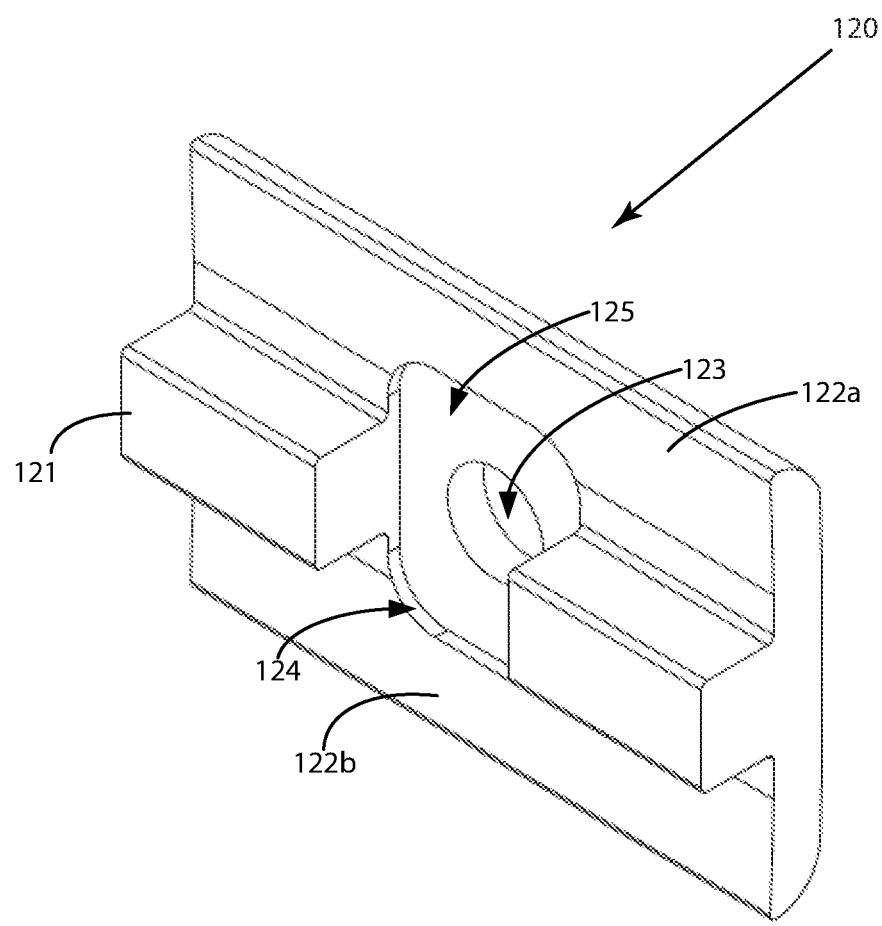
FIG. 3A depicts a perspective view of a mid clamp portion of the integrated bonding mid clamp of FIGS. 1-2 in accordance with one embodiment.
Figure 3B:
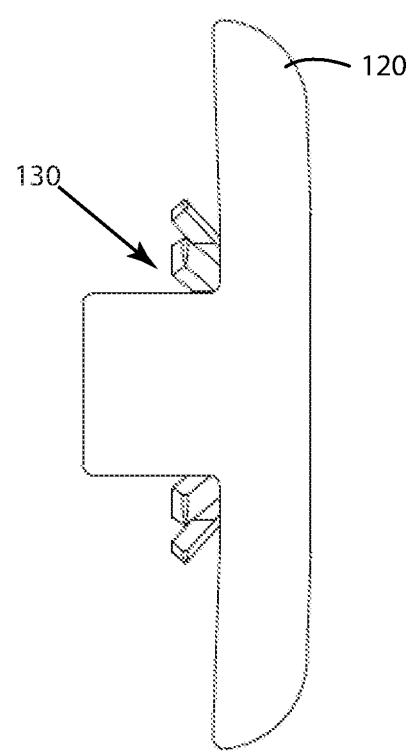
FIG. 3B depicts a side view of the mid clamp portion of FIG. 3A together with a deformable toothed washer of the integrated bonding mid clamp in which the deformable toothed washer is in a non-deformed state in accordance with one embodiment.
Figure 3C:
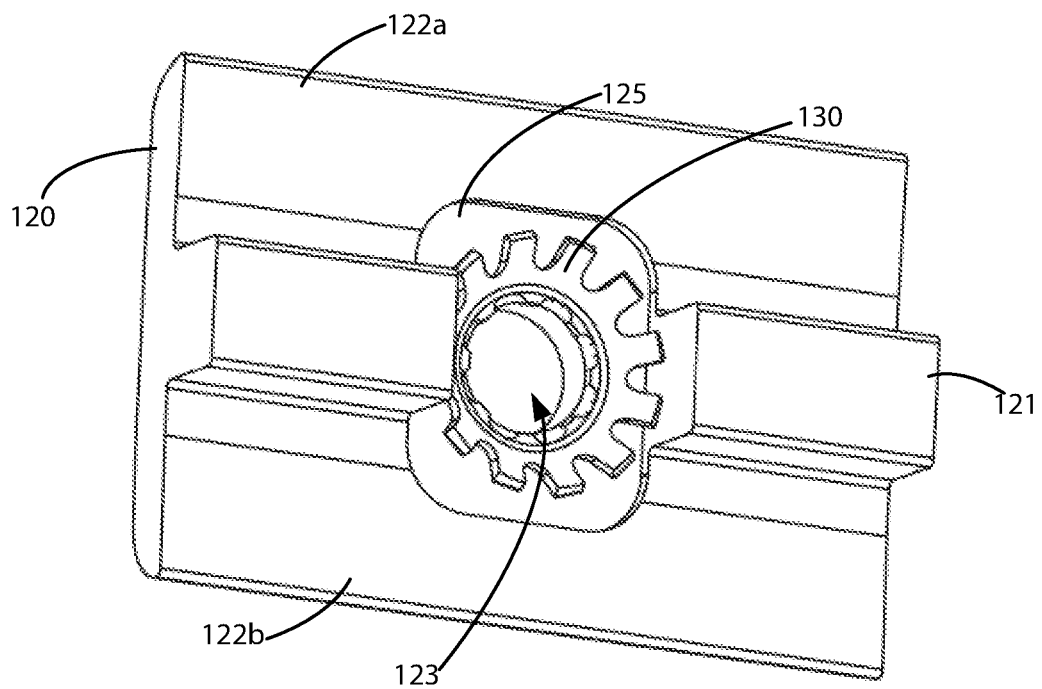
FIG. 3C depicts a perspective view of the mid clamp portion together with the deformable toothed washer of the integrated bonding mid clamp of FIG. 3B in accordance with one embodiment.

Referring now to FIGS. 3A-3C, the mid clamp portion 120 is shown according to one embodiment. In one embodiment, the mid clamp portion 120 may be roughly T-shaped, having a rail portion 121, and corresponding flat portions 122a, 122b located on either side of the rail portion 121.

Figure 5A:
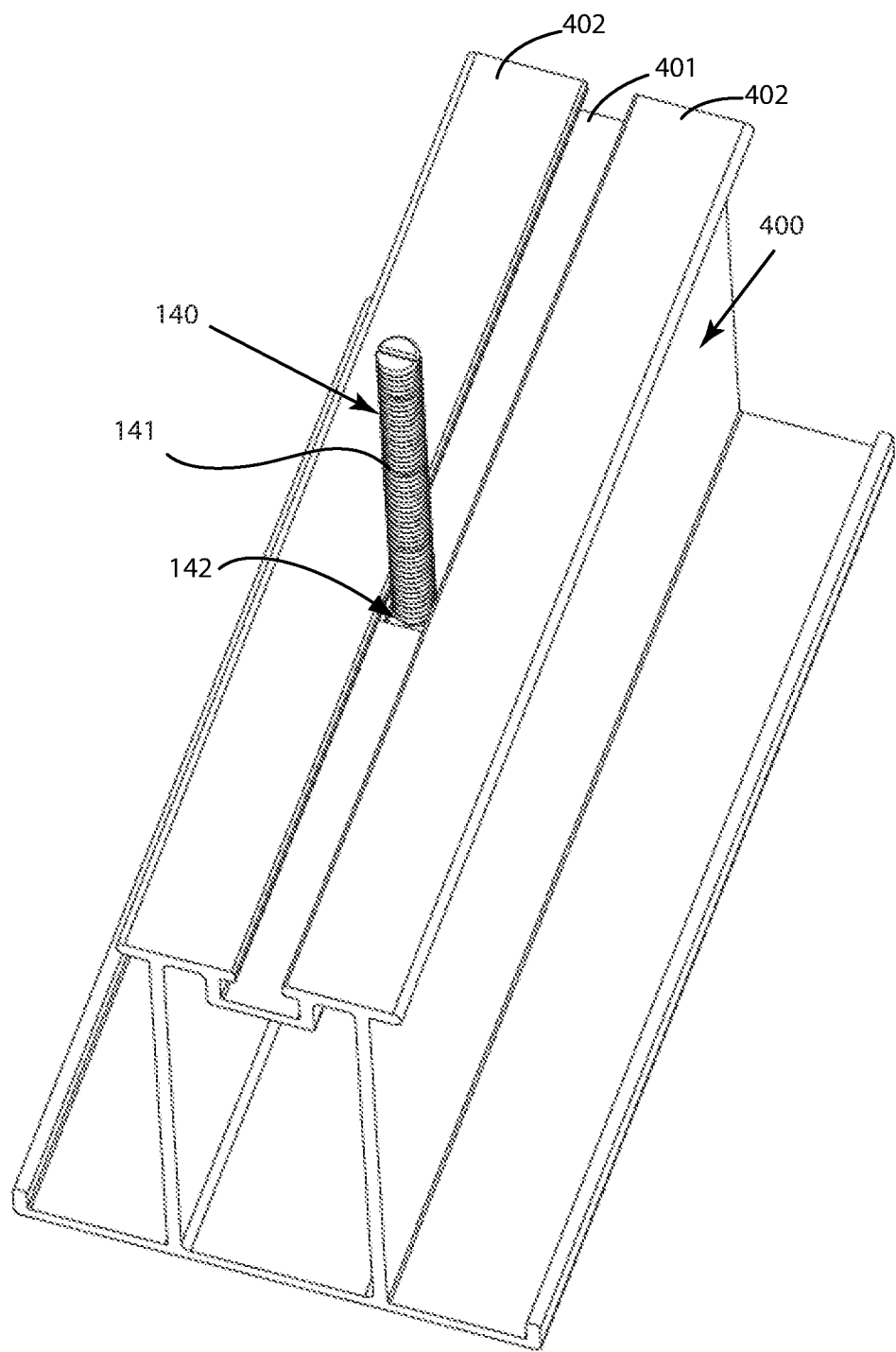
FIG. 5A depicts a perspective view of an integrated bonding mid clamp being used to secure solar panel frames to a support rail wherein a bolt portion of the integrated bonding mid clamp is inserted into a channel of the support rail in accordance with one embodiment.
Figure 5B:
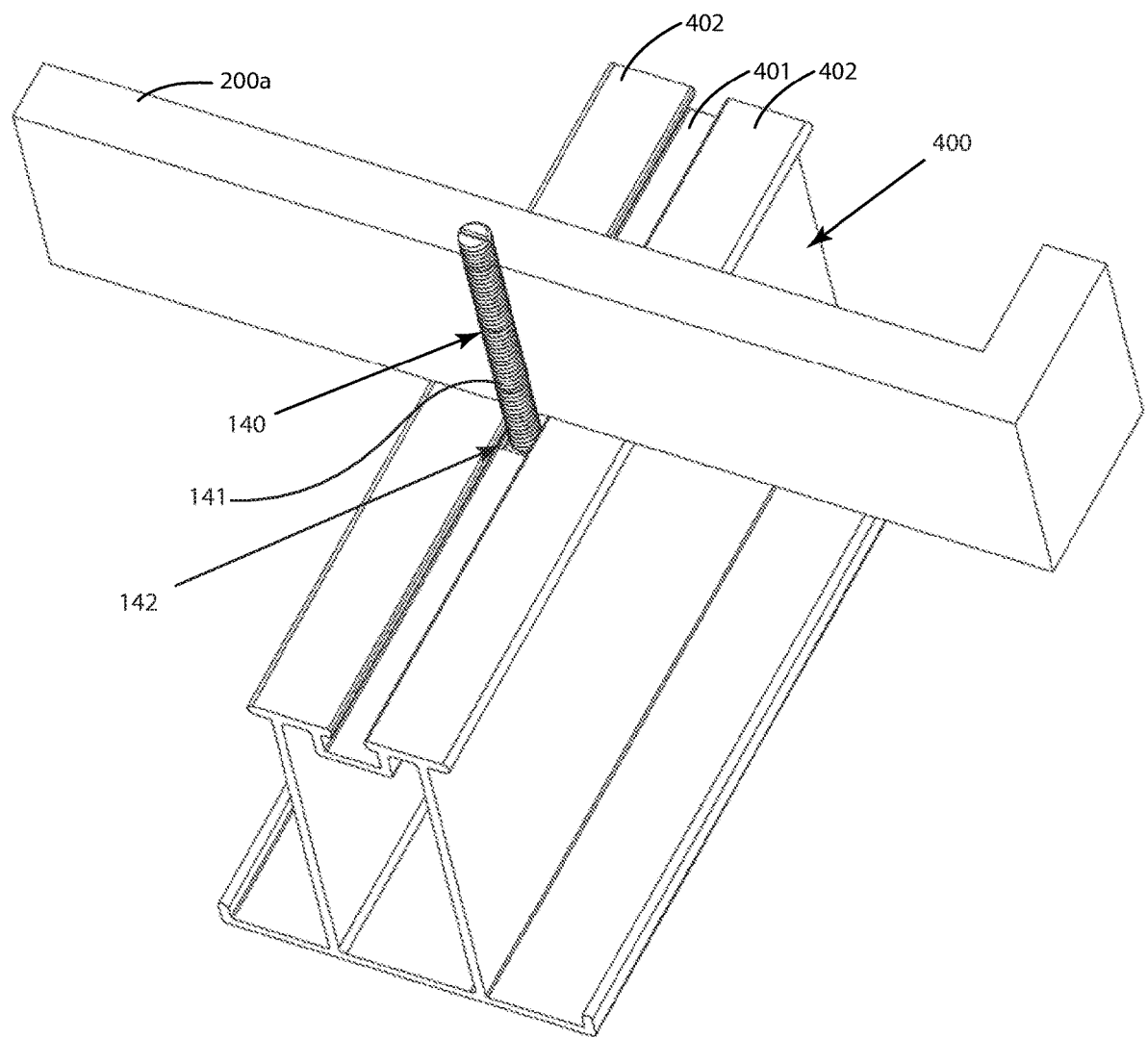
FIG. 5B depicts a perspective view of the integrated bonding mid clamp being used to secure solar panel frames to the support rail as shown in FIG. 5A, further wherein a first solar panel frame is positioned on the support rail in accordance with one embodiment.
Figure 5C:
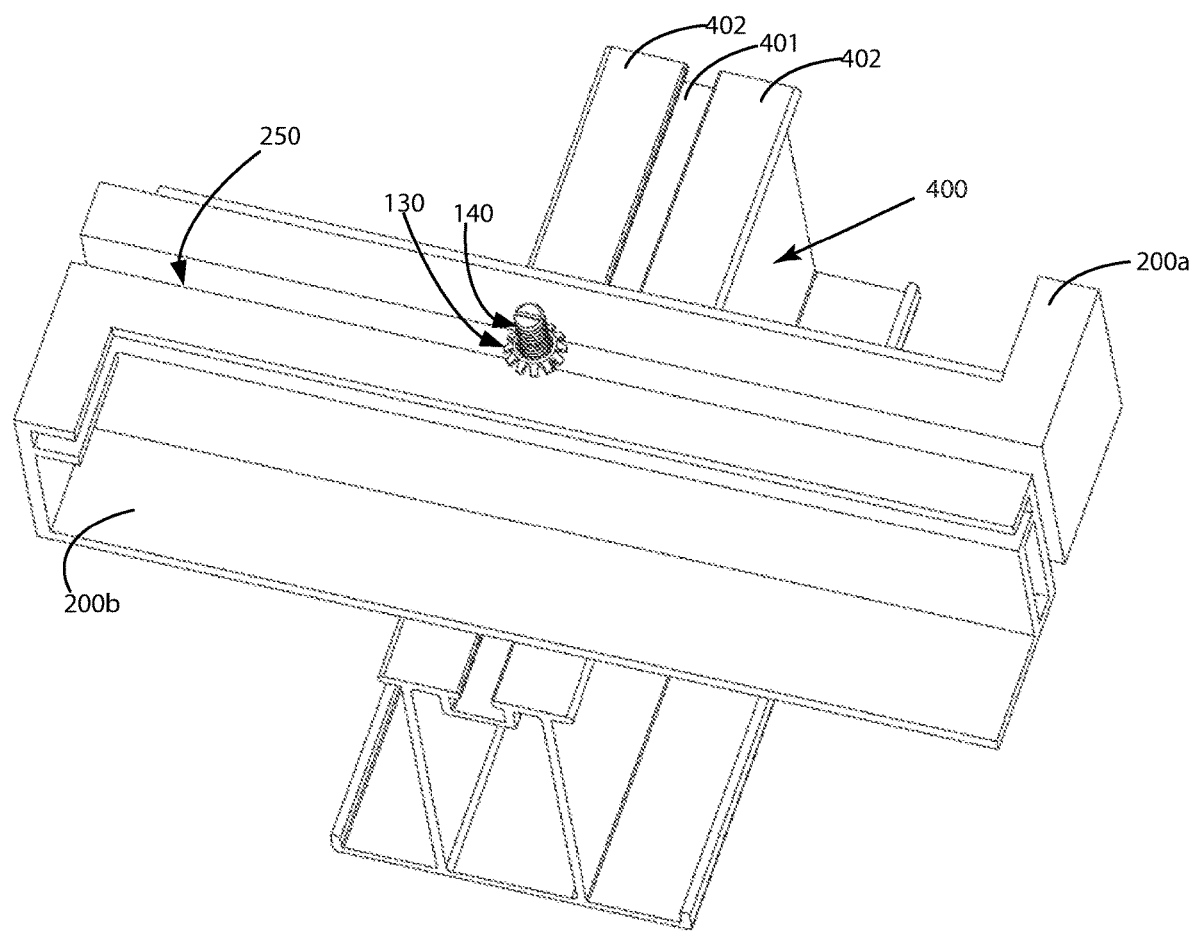
FIG. 5C depicts a perspective view of the integrated bonding mid clamp being used to secure solar panel frames to the support rail as shown in FIGS. 5 A-B, further wherein the first solar panel frame and a second solar panel frame are positioned on the support rail and a deformable toothed washer is positioned on the bolt portion above the first and second solar panel frames in accordance with one embodiment.
Figure 5D:
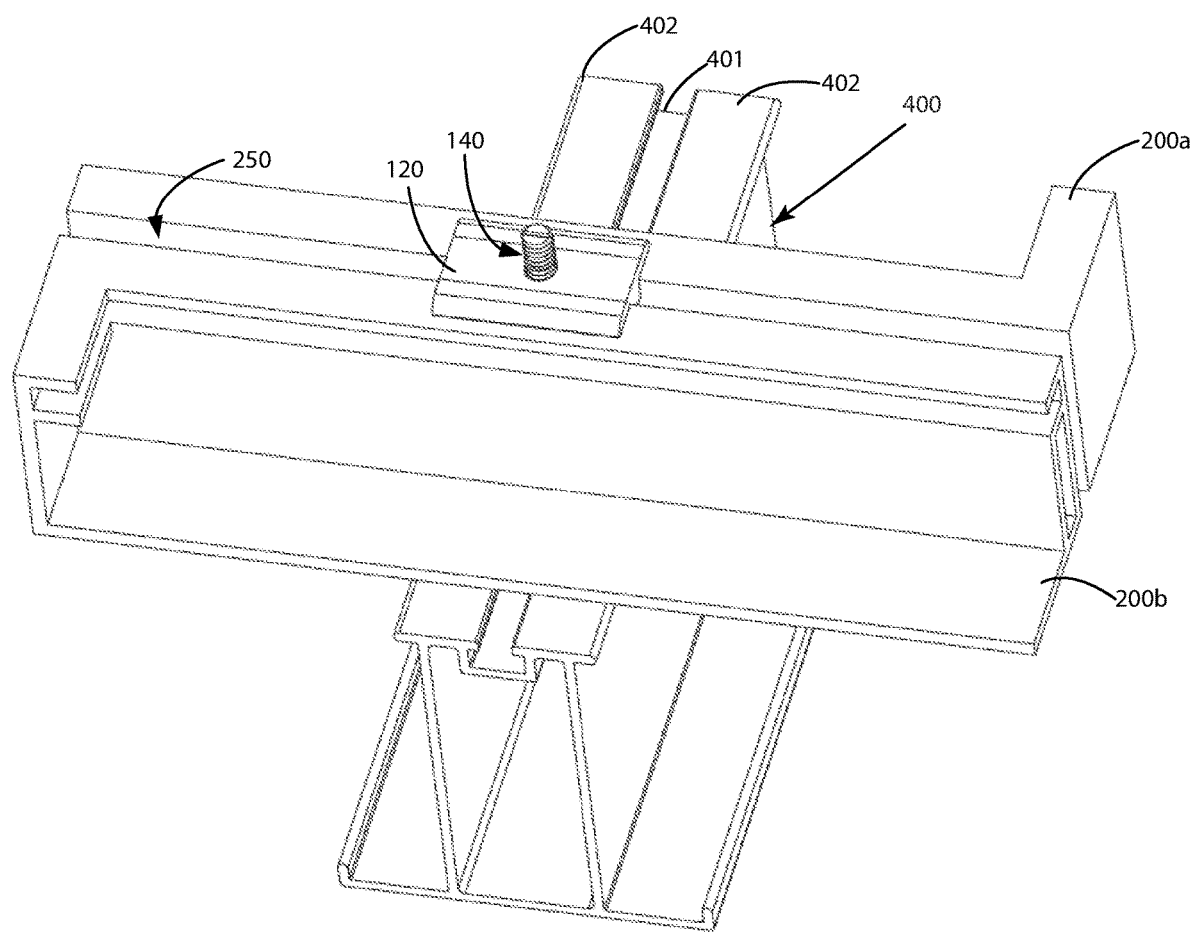
FIG. 5D depicts a perspective view of the integrated bonding mid clamp being used to secure solar panel frames to the support rail as shown in FIGS. 5 A-C, further wherein a mid clamp portion is positioned on the bolt portion above the deformable toothed washer in accordance with one embodiment.
Figure 5E:
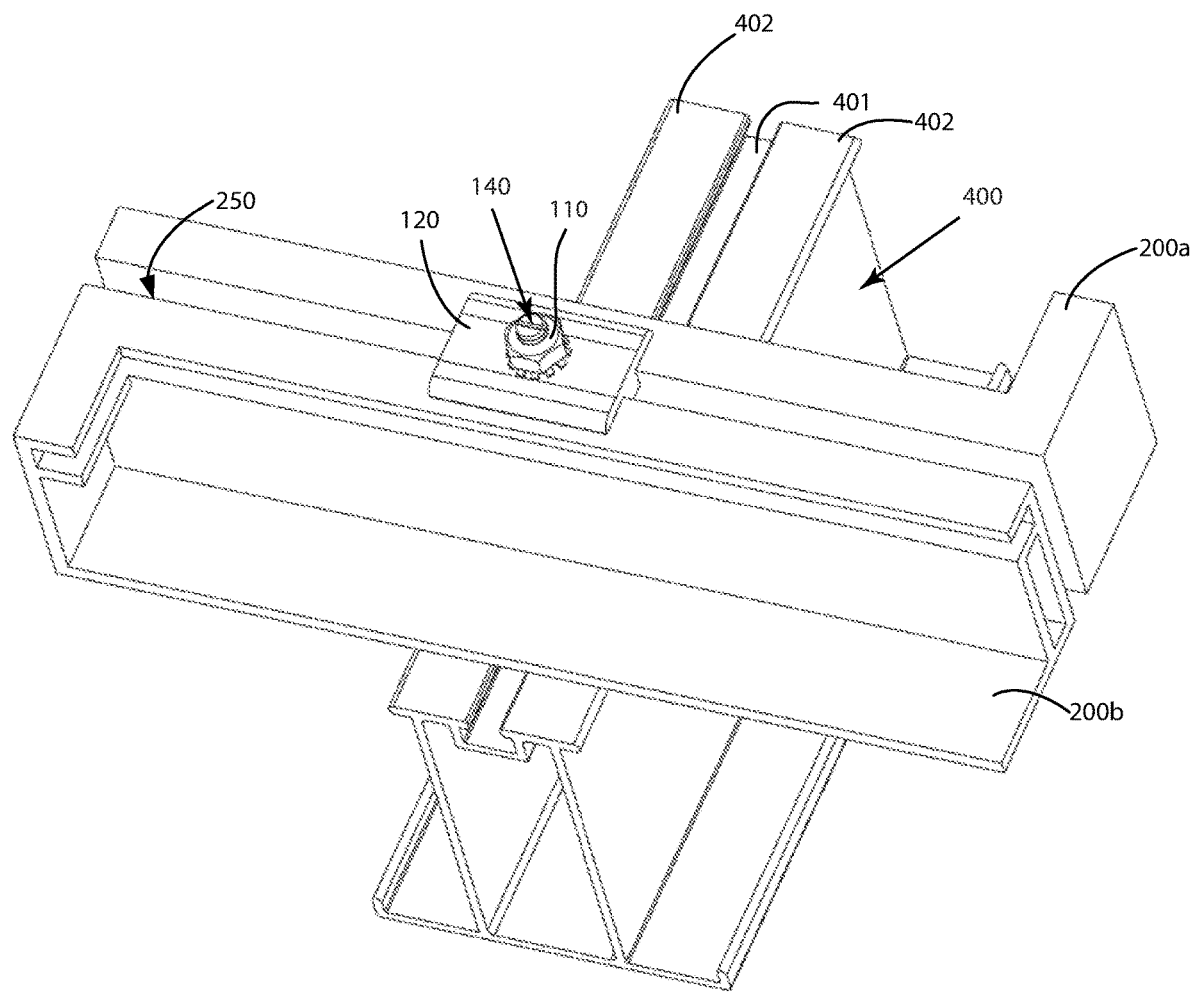
FIG. 5E depicts a perspective view of the integrated bonding mid clamp being used to secure solar panel frames to the support rail as shown in FIGS. 5 A-D, further wherein a lock nut is positioned on the bolt portion above the mid clamp portion in accordance with one embodiment.

The rail portion 121 may be configured to correspond to the space 250 located between the solar panel frames, such as solar panel frames 200a and 200b shown in FIGS. 5A-5E. In one embodiment, when the integrated bonding mid clamp device is assembled and used to fasten the solar panel frames 200a, 200b to the support rail 400, the rail portion 121 may rest between solar panel frames 200a, 200b while the underside of the corresponding flat portions 122a, and 122b rest on the solar panel frames 200a, 200b, respectively, as shown in FIGS. 5D and 5E.

Referring back to FIGS. 3A-3C, the mid clamp portion 120 may also comprise a mid clamp hole 123. The mid clamp hole 123 may be configured to allow passage of at least a portion of the bolt portion 140 as is described below. The mid clamp portion 120 may also have a recessed area 125. The recessed area 125 may be located in the center of the rail portion 121. The area within the perimeter, i.e., the entire recessed area 125 may be substantially flat. Referring specifically to FIG. 3A, the recessed area 125 may also have a depth 124. In one embodiment, the depth 124 of the recessed area 125 may be the distance from the underside of the corresponding flat portions 122a, 122b to the substantially flat plane inside the recessed area 125.

The recessed area 125 may be configured to accept the deformable toothed washer 130 as shown in FIGS. 3B and 3C. The recessed area 125 may be configured so that the deformable toothed washer 130 fits entirely within the recessed area in either a deformed or non-deformed state. For example, the perimeter of the recessed area 125 may be wider than the radius of the deformable toothed washer 130 such that the farthest edge of the projections or teeth 131 is located inside the perimeter of the recessed area 125. The perimeter of the recessed are 125 may be of a size such that the edge of the projections or teeth 131 are flush with the perimeter when the deformable toothed washer is in a deformed or non-deformed state. Further, the perimeter of the recessed area 125 may be a size such that the farther edge of at least one of the projections or teeth 131 fits within the perimeter in either a deformed or non-deformed state.

FIG. 6 depicts an embodiment in which the deformable toothed washer 130 fits within the recessed area 125 of the mid clamp portion 120 when the deformable toothed washer 130 is in a deformed state.

Figure 4A:
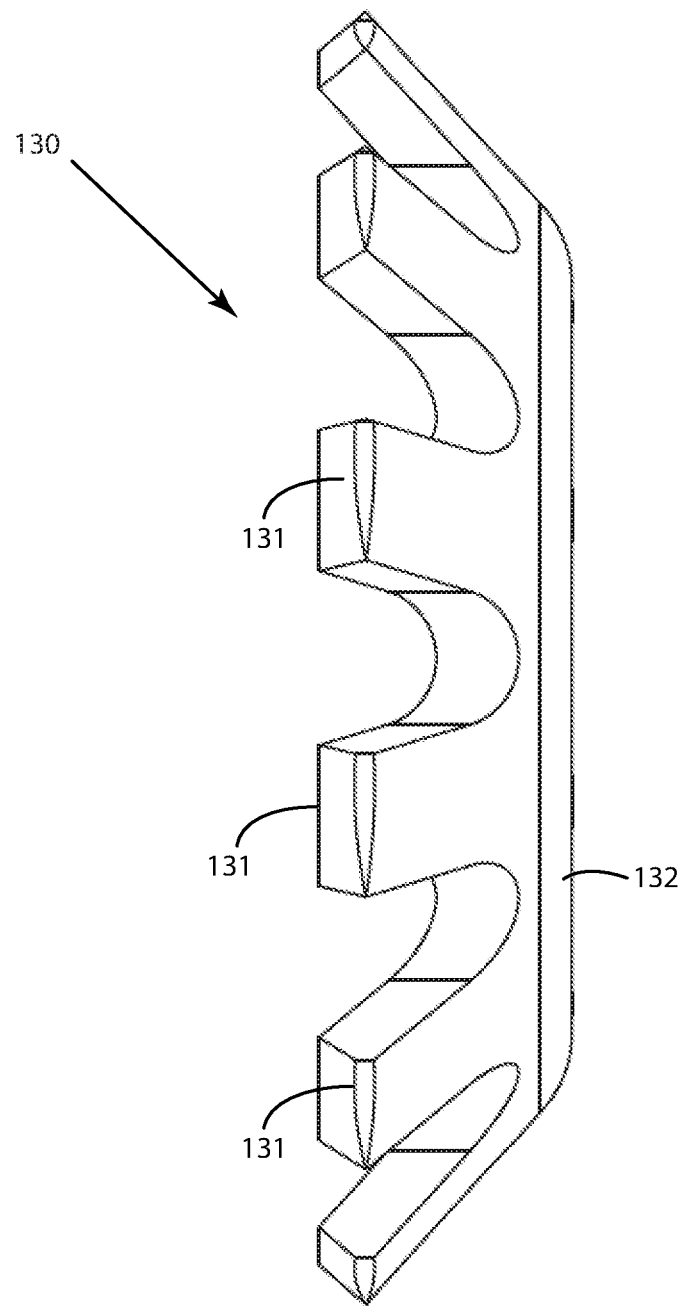
FIG. 4A depicts a side perspective view of the deformable toothed washer of FIG. 3B in accordance with one embodiment.
Figure 4B:
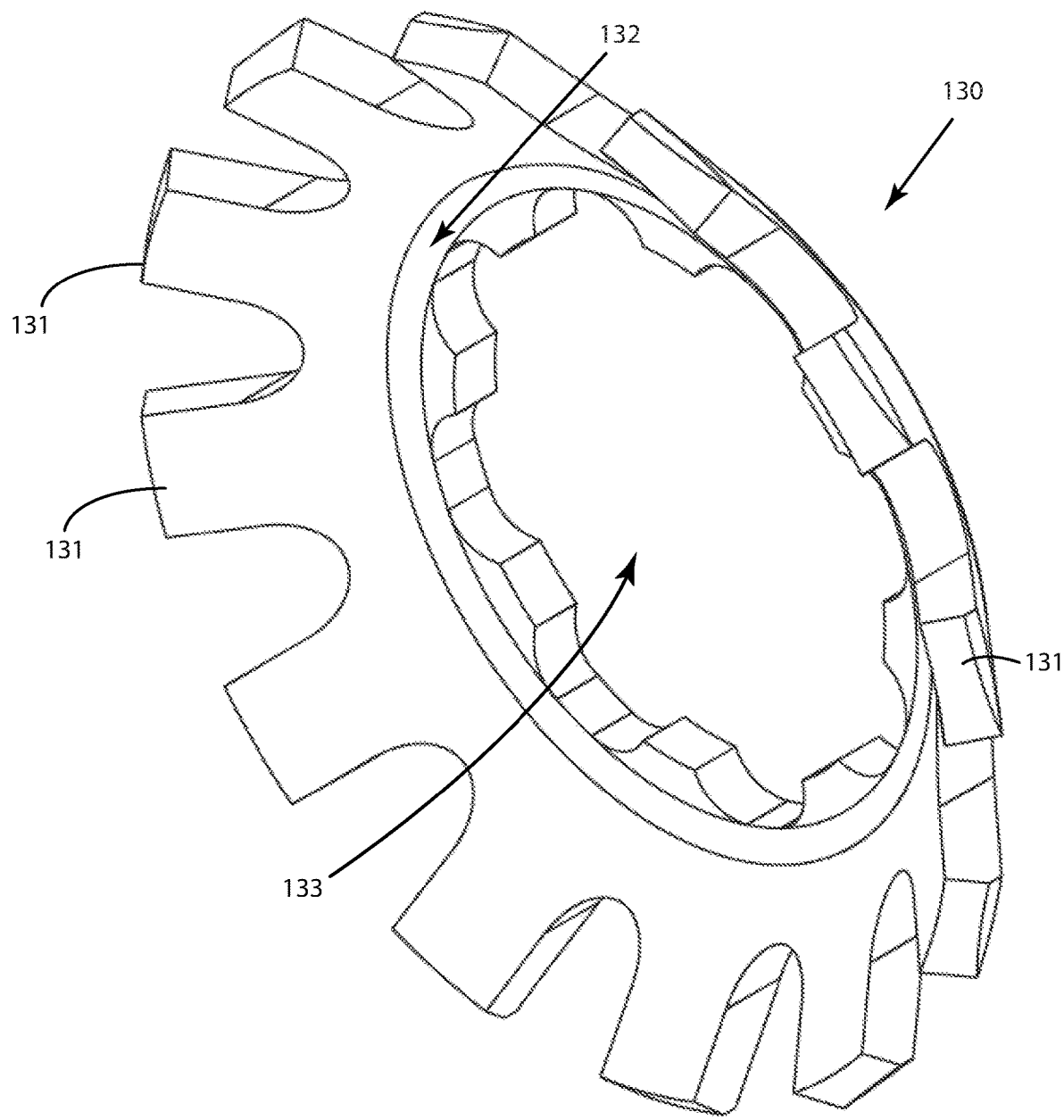
FIG. 4B depicts a front perspective view of the deformable toothed washer of FIGS. 3B and 4A in accordance with one embodiment.

Referring now to FIGS. 4A and 4B, the deformable toothed washer 130 is shown in a non-deformed state according to one embodiment of the invention. The deformable toothed washer 130 may be a deformable counter sunk external tooth lockwasher or the like. Referring to FIG. 4A, a side view of the deformable toothed washer 130 is shown in a non-deformed state. The deformable toothed washer 130 may have a truncated conical shape as shown. For example, the deformable toothed washer 130 may include a plurality of projections or teeth 131 extending outward from a central round or annular area 132. The central round or annular area may have cutouts or other features for saving material, improving strength, etc. As shown in FIG. 4B, the central round or annular area 132 may form or include a washer hole 133. The washer hole 133 may be configured to substantially align with the mid clamp hole 123 of the mid clamp portion 120 and may permit passage of at least a portion of the bolt member 140 as is described in more detail below. The projections or teeth 131 may extend substantially radially outward from the center round or annular area 132 but may be angled to give the deformable toothed washer 130 a truncated conical shape.

The projections or teeth 131 may be configured to break the anodized layer of the solar panel frames 200a, 200b. For example, the projections or teeth 131 may be capable of breaking the anodized layer by scraping, ripping, scratching, tearing, cutting, piercing, and the like. The projections or teeth 131 may have sharpened or angled edges, further tooth projections, and the like configured to more efficiently break the anodized layer.

As shown in FIGS. 3B and 3C, when the deformable toothed washer 130 is in a non-deformed state and placed into the recessed area 125 of the mid clamp portion 120, the edges of the projections or teeth 131 may extend outward from the substantially flat plane inside the recessed area 125, i.e., they may extend outward from the depth 124 of the recessed area 125. Contrarily, the center round or annular portion 132 may be in contact with the mid clamp portion 120 within the recessed area 125. The center round or annular portion 132 of the deformable toothed washer 130 in the non-deformed state may be in contact with the substantially flat plane of the recessed area 125, while the projections or teeth 131 may extend past the depth 124 of the recessed area 125. For example, when the deformable toothed washer 130 is in a non-deformed state and placed into the recessed area 125, the projections or teeth 131 may extend out of the depth 124 of the recessed area 125 when the center round or annular portion 132 is in contact with (is flush with) the recessed area 125, i.e., the projections or teeth 131 may protrude out of the recessed area 125 such that they extend out past the underside of the corresponding flat portions 122a, 122b. Even when the projections or teeth 131 protrude out past the depth 124 of the recessed area 125, one or more of the projections or teeth 131 may still be located within the perimeter of the recessed area 125 as shown in FIG. 3C. Further, when the projections or teeth 131 protrude out past the depth 124 of the recessed area 125, the entirety of the deformable toothed washer 130 may still be located within the perimeter of the recessed area 125 as shown in FIG. 3C.

Referring back to FIGS. 1 and 2, the bolt portion 140 is shown according to one embodiment. The bolt portion 140 may be configured to have a T-shape. For example, the bolt portion 140 may have a threaded shaft portion 141 and a wider bolt head 142. The threaded shaft portion 141 may be configured so that at least a portion of the threaded shaft portion 141 may extend through the mid clamp hole 123 of the mid clamp portion 120 and the washer hole 133 of the deformable toothed washer 130 when the integrated bonding mid clamp device 100 is assembled and used for fastening the solar panel frames 200a, 200b to the support rail 400.

The bolt portion 140 may also include a bolt head 142 that is wider than the threaded shaft portion 141 in at least one direction. The bolt head 142 may be configured to fit within the channel 401 of the rail 400. The bolt head 142 may be configured to fit snugly within the channel 401 of the rail 400. In another embodiment, the bolt head 142 and the support rail 400 may be configured such that the channel 401 and/or the raised walls 402 retain the bolt head 142 when the integrated bonding mid clamp device 100 is in use.

The bolt head 142 may contain raised ridges or similar features on a side proximate the threaded shaft portion 141, such as the ridges 143 shown in FIGS. 1 and 2. The ridges 143 may be configured to break the anodized layer of the support rail 400, when the integrated bonding mid clamp device 100 is used to tighten the solar panel frame 200a and/or 200b to the support rail 400 as shown in FIGS. 5A-5E. Breaking of the anodized layer of the support rail 400 may be accomplished by a piercing or similar action of the ridges 143 as the integrated bonding mid clamp device 100 tightens the solar panel frame 200a and/or 200b to the support rail.

Referring still to FIGS. 1 and 2, the lock nut 110 may be threaded. The lock nut 110 may threadably attach to the bolt portion 140 at the threaded shaft portion 142. The lock nut 110 may be tightened by rotational movement down the bolt portion 140 toward the bolt head 142.

FIGS. 5A-5E depict the integrated bonding mid clamp 100 in use to secure solar panel frames 200a, 200b to a support rail 400. When the integrated bonding mid clamp device 100 is in use, the bolt head 142 of the bolt portion 140 may be placed into the channel 401 of the support rail 400 so that the bolt head 142 is retained in the channel 401. Solar panel frames 200a and 200b may be placed substantially perpendicular to the support rail 400 on either side of the bolt portion 140. The deformable toothed washer 130 may be placed, in a non-deformed state, on the bolt portion 140 so that the threaded shaft portion 141 passes through the washer hole 133. The mid clamp portion 120 may also be placed on the bolt portion 140 and the deformable toothed washer 130 such that the deformable toothed washer 130 is situated in the recessed area 125, the rail portion 121 is situated between the solar panel frames 200a and 200b, the undersides of the corresponding flat portions 122a and 122b rest on the solar panel frames 200a and 200b respectively, and the threaded shaft portion 142 of the bolt portion 140 extends through the mid clamp hole 123 of the mid clamp portion 120. The lock nut 110 may be placed on the threaded shaft portion 142 of the bolt portion 140 above the mid clamp portion 120.

The lock nut 110 may be tightened by rotational activation. The tightening of the lock nut 110 may force the mid clamp portion 120 downward onto the solar panel frames 200a and 200b, and the solar panel frames 200a and 200b downward onto the support rail 400. The corresponding flat portions 122a, 122b of the mid clamp portion may likewise be forced downward onto the solar panel frames 200a and 200b.

As the lock nut 110 is tightened and the integrated bonding mid clamp device 100 forces the solar panel frames 200a, 200b and the support rail 400 together, the projections or teeth 131 of the deformable toothed washer 130 may break the anodized layer of the solar panel frames 200a, 200b. Breaking may be accomplished by contact between the projections or teeth 131 of the deformable toothed washer 130 and the anodized layer of the solar panel frames 200a, 200b during tightening. For example, the projections or teeth 131 may scrape, rip, scratch, tear, cut, or otherwise break the anodized layer of the solar panel frames 200a, 200b. Similarly, as the lock nut 110 is tightened and the integrated bonding mid clamp device 100 forces the solar panel frames 200a, 200b and the support rail 400 together, the ridges 143 of the bolt head 142 may break the anodized layer of the support rail 400. For example, the ridges 143 may pierce or otherwise break the anodized layer of the support rail 400.

As tightening occurs, the deformable toothed washer 130 may also be pressed into a deformed state. In the deformed state, one or more of the projections or teeth 131 of the deformable toothed washer 130 may be pushed back toward the plane of the center round or annular portion 132 and the washer hole 133. For example, the deformable toothed washer 130 may deform from the truncated conical shape into a shape that is flatter, i.e., a shape that more closely approaches a flat disk shape or in which one or more of the projections or teeth 131 are flatter. The one or more projections or teeth 131 pushed back may be pushed back so that they are located within the depth 124 of the recessed area 125 of the mid clamp portion 120. When in the deformed state, the one or more projections or teeth 131 of the deformable toothed washer 130 which are pushed back may extend more substantially radially outward from the center round or annular portion 132, and have a shallower angle, i.e., the deformable toothed washer 130 may have a less conical shape when compared to the non-deformed state, at least with respect to the one or more projections or teeth 131 which are pushed back.

Figure 6A:
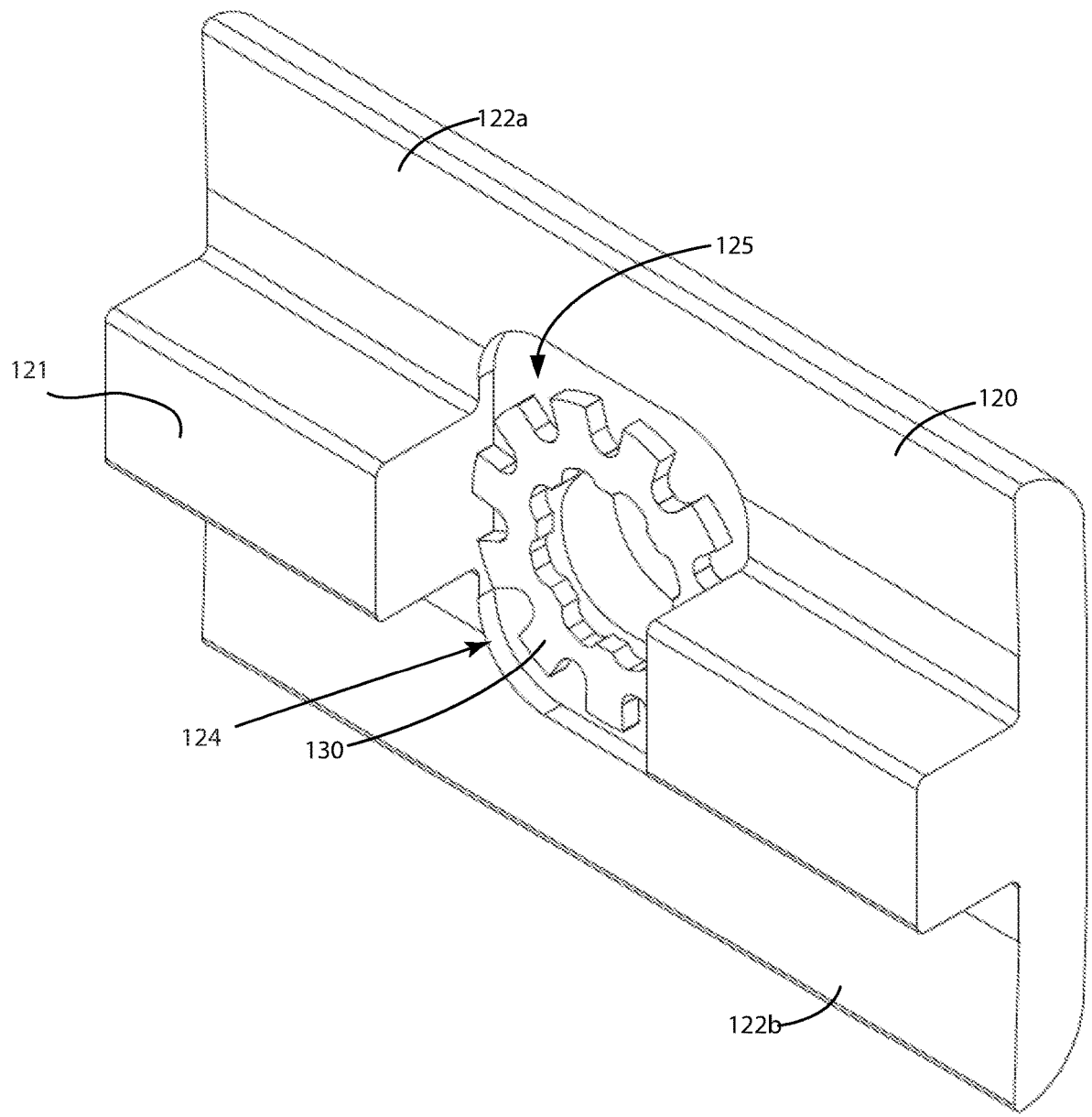
FIG. 6A depicts a side perspective view of the deformable toothed washer in a deformed state in accordance with one embodiment.

FIG. 6A depicts the deformable toothed washer 130 in a deformed state according to one embodiment, i.e. a substantially flattened state after tightening of the lock nut 110 and clamping of the solar panel frames 200a, 200b to the support rail 400 by the integrated bonding mid clamp 100. As shown in FIG. 6A, all of the projections or teeth may be pushed back into a flatter shape.

Figure 6B:
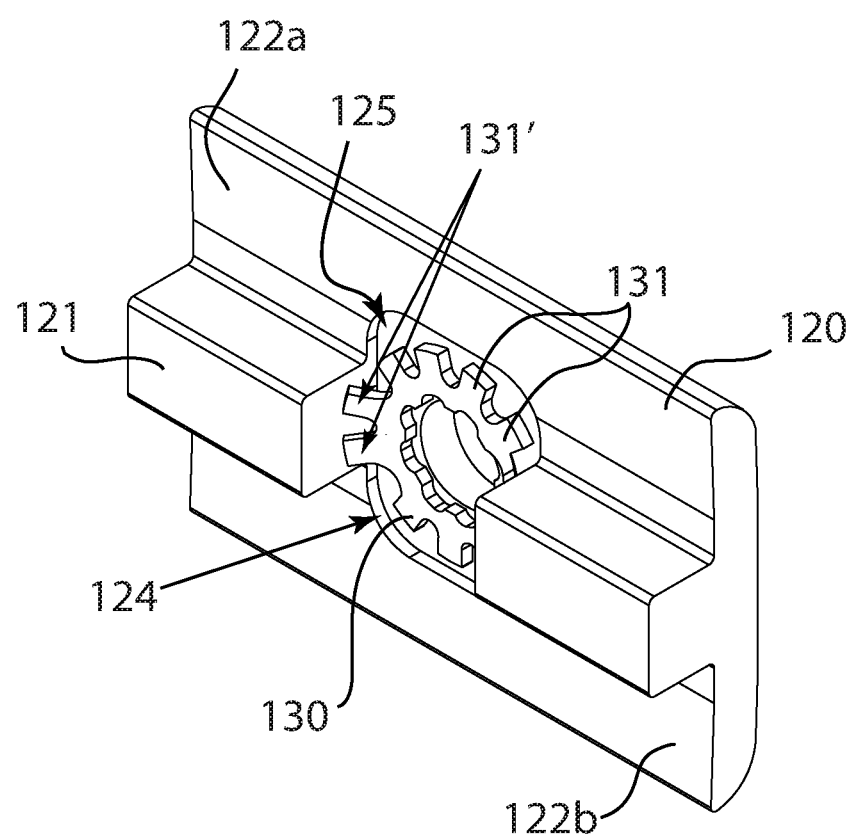
FIG. 6B depicts a side perspective view of the deformable toothed washer in a deformed state in accordance with one embodiment.

FIG. 6B also depicts the deformable toothed washer 130 in the deformed state according to one embodiment, i.e. a substantially flattened state after tightening of the lock nut 110 and clamping of the solar panel frames 200a, 200b to the support rail 400 by the integrated bonding mid clamp 100. In the embodiment shown in FIG. 6B, the projections or teeth 131 may include center projections or teeth 131' located proximate to the rail portion 121 of the mid clamp 120. As shown in FIG. 6B, due to the position of the rail portion 121 of the mid clamp 120, the center projections or teeth 131' may not flatten when the lock nut 110 is tightened, clamping of the solar panel frames 200a, 200b to the support rail by the integrated bonding mid clamp 100 occurs, and the deformable toothed washer 130 is pressed into the deformed state.

As shown in FIGS. 6A and 6B, when the deformable toothed washer 130 is in the deformed state, the deformable toothed washer 130 may still be located entirely within the perimeter of the recessed area 125. As shown in FIGS. 6A and 6B, the deformable toothed washer 130 is located entirely within the perimeter of the recessed area 125. Further, as shown in FIG. 6A, the deformable toothed washer 130 may also be entirely within the depth 124 of the recessed area 125 when in the deformed stated; thus, the deformable toothed washer 130 does not impede contact between the mid clamp portion 120 and the solar panel frames 200a, 200b. As shown in FIG. 6B, when the deformable toothed washer 130 is in the deformed state, the center projections or teeth 131' may not flatten. However, the deformable toothed washer 130 still does not impede contact between the mid clamp portion 120 and the solar panel frames 200a, 200b because the center projections or teeth 131' may be located in the space 250 between the solar panel frames 200a, 200b.

Further, contact between the integrated bonding mid clamp 100 and the solar panel frames 200a, 200b is not limited to the projections or teeth 131 of the deformable toothed washer. Instead, the undersides of corresponding flat portions 122a, 122b of the mid clamp portion 120 may fully contact the solar panel frames 200a, 200b, respectively, following deformation of the deformable toothed washer 130.

The integrated bonding mid clamp 100 may be used to attach, mount, and/or ground solar panels and solar panel arrays in one embodiment.

The integrated bonding mid clamp 100 may be used as part of a system for attaching, mounting, and/or grounding solar panels and solar panel arrays. The system may include support rails such as the support rail 400 described above. The system may also include panel frames such as the panel frames 200a, 200b described above. The system may also include additional components for attaching, mounting, and/or grounding such as the copper wire described above and other components used to continue the path to ground.

The integrated bonding mid clamp 100 may be used in a method of clamping a solar panel frame to a support rail. The method may also provide grounding as described above such as by breaking an anodized layer of a panel frame as part of a path to ground.

The method may include the step of providing a support rail such as the support rail 400. The support rail may have a channel such as the channel 401. The support rail may also have one or more raised portions such as the raised portions 402.

The method may also include the step of providing one or more solar panel frames such as the solar panel frames 200a and 200b described above. The solar panel frames may have an anodized layer as described above.

The method may also include the step of positioning the solar panel frames such that the two solar panel frames are separated by a space, such as the space 250 described above. Further the solar panel frames may be positioned so that each solar panel frame has a surface that is substantially perpendicular to the support rail.

The method may also include the step of providing a clamping device such as the integrated bonding mid clamp 100 described above. The clamping device may comprise a mid clamp portion such as the mid clamp portion 120 described above. The clamping device may also comprise a deformable toothed washer such as the deformable toothed washer 130 described above. The clamping device may also comprise a bolt portion such as the bolt portion 140 described above. The clamping device may also comprise a lock nut such as the lock nut 110 described above.

The method may also comprise the steps of inserting the bolt head into the channel of the support rail, such that the threaded shaft extends from the channel of the support rail in between the two solar panels, passing the threaded shaft through the round washer hole and the mid clamp hole, and tightening the lock nut on to the threaded shaft to clamp the solar panel frame between the mid clamp portion and the support rail; wherein tightening the lock nut causes the projections of the deformable toothed washer to break the anodized layer of the solar panel frame; and further wherein tightening the lock nut causes the deformable toothed washer to transition into a deformed state in which at least one of the projections no longer extend from the depth of the recessed area.

Elements of the embodiments have been introduced with either the articles "a" or "an." The articles are intended to mean that there are one or more of the elements. The terms "including" and "having" and their derivatives are intended to be inclusive such that there may be additional elements other than the elements listed. The conjunction "or" when used with a list of at least two terms is intended to mean any term or combination of terms. The terms "first" and "second" are used to distinguish elements and are not used to denote a particular order.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

I claim:

1. An integrated bonding mid clamp device for use with a solar panel array, comprising:
    a mid clamp portion having a recessed area, the recessed area having a perimeter and a depth;
    a deformable toothed washer configured to fit within the perimeter of the recessed area, wherein the deformable toothed washer has projections that extend past the depth of the recessed area when the deformable toothed washer is in a non-deformed state; and
    a tightening mechanism configured to clamp the mid clamp portion to at least one solar panel frame;
    wherein the deformable toothed washer is configured to deform into the recessed area when the tightening mechanism clamps the mid clamp portion to the at least one solar panel frame wherein the projections of the deformable toothed washer are configured to break an anodized layer of the solar panel frame when the tightening mechanism clamps the mid clamp portion to the solar panel frame.

2. The integrated bonding mid clamp device of claim 1 wherein the deformable toothed washer has a substantially truncated conical shape when in the non-deformed state.

3. The integrated bonding mid clamp device of claim 1 wherein the deformable toothed washer has a substantially flat shape when in the deformed state.

4. The integrated mid clamp device of claim 1, wherein the mid clamp has a rail portion.

5. The integrated mid clamp device of claim 4, wherein the rail portion of the mid clamp is configured to be situated between two solar panel frames.

6. The integrated bonding mid clamp device of claim 1, wherein the deformable toothed washer is configured to deform such that at least one of the projections fits entirely within the recessed area and does not extend past the depth of the recessed area of the mid clamp portion when the tightening mechanism clamps the mid clamp portion to the at least one solar panel frame.

7. The integrated bonding mid clamp device of claim 1, wherein the mid clamp portion includes at least one flat surface, and wherein the recess extends into the flat surface.

8. A solar panel attachment system, comprising:
    a solar panel having a solar panel frame, wherein the solar panel frame has an anodized layer;
    a support rail configured to support the solar panel and the solar panel frame, wherein the support rail has a channel; and
    an integrated bonding mid clamp device, the integrated bonding mid clamp device comprising:
        a mid clamp portion with a recessed area, the recessed area having a perimeter and a depth, the mid clamp portion further having a mid clamp hole;
        a deformable toothed washer configured to fit within the perimeter of the recessed area, wherein the deformable toothed washer has projections that extend past a depth of the recessed area when the deformable toothed washer is in a non-deformed state; and
        a tightening mechanism configured to clamp the mid clamp portion to the solar panel frame, wherein the deformable toothed washer is configured to deform such that at least one of the projections does not extend past the depth of the recessed area of the mid clamp portion when the tightening mechanism clamps the mid clamp portion to the at least one solar panel frame, wherein the tightening mechanism further includes:
            a bolt portion having a bolt head and a threaded shaft, wherein the bolt head is configured to be retained by the channel of the support rail and the threaded shaft is configured to pass through the washer hole and the mid clamp hole; and
            a nut configured to threadably attach to the threaded shaft after the threaded shaft has passed through the washer hole and the mid clamp hole, wherein the nut and the mid clamp portion move toward the bolt head as the nut is tightened;
    wherein tightening of the nut secures the solar panel frame to the support rail using the integrated bonding mid clamp device;
    wherein tightening of the nut causes the projections of the deformable toothed washer to break the anodized layer of the solar panel frame; and further wherein tightening of the nut causes the deformable toothed washer to deform into the recessed area and transition into a deformed state.

9. The solar panel attachment system of claim 8, further comprising a second solar panel having a second solar panel frame and a second anodized layer, and
wherein the step of tightening the nut also secures the second solar panel frame to the support rail using the integrated bonding mid clamp device and causes the projections of the deformable toothed washer to break the anodized layer of the second solar panel frame.

10. The solar panel attachment system of claim 9, wherein the mid clamp also comprises a rail portion configured to be situated in between the solar panel frame and the second solar panel frame.

11. The solar panel attachment system of claim 8, wherein the deformable toothed washer has a substantially truncated conical shape when in the non-deformed state.

12. The solar panel attachment system of claim 8, wherein the deformable toothed washer has a substantially flat shape when in the deformed state.

13. A method of clamping at least one solar panel frame to a support rail, wherein the method of clamping breaks an anodized layer of at least one solar panel frame, the method comprising:
providing a support rail having a channel;
providing at least one solar panel frame having an anodized layer;
positioning the at least one solar panel frame so that the at least one solar panel frame has a surface that is substantially perpendicular to the support rail;
providing a clamping device, the clamping device comprising:
a mid clamp portion with a recessed area, the recessed area having a perimeter and a depth, the mid clamp portion further including a mid clamp hole;
a deformable toothed washer configured to fit within the perimeter of the recessed area, wherein the deformable toothed washer has projections that extend past a depth of the recessed area when the deformable toothed washer is in a non-deformed state; and
a tightening mechanism configured to clamp the mid clamp portion to at least one solar panel frame, wherein the deformable toothed washer is configured to deform such that at least one of the projections does not extend past the depth of the recessed area of the mid clamp portion when the tightening mechanism clamps the mid clamp portion to the at least one solar panel frame, wherein the tightening mechanism further includes:
a bolt portion having a bolt head and a threaded shaft; and
a nut configured to threadably attach to the threaded shaft;
inserting the bolt head into the channel of the support rail;
passing the threaded shaft through the deformable toothed washer and the mid clamp hole;
tightening the nut on to the threaded shaft to clamp the at least one solar panel frame between the mid clamp portion and the support rail;
wherein tightening the nut causes the projections of the deformable toothed washer to break the anodized layer of the at least one solar panel frame; and
further wherein tightening the nut causes the deformable toothed washer to deform into the recessed area and transition into a deformed.

14. The method of clamping at least one solar panel frame to a support rail of claim 13, further comprising:
wherein the step of providing at least one solar panel frame having an anodized layer comprises providing a first solar panel frame having an anodized layer and providing a second solar panel frame having a second anodized layer;
wherein the first and second solar panel frames are separated by a space; and
wherein the step of inserting the bolt head into the channel of the support rail comprises inserting the bolt head into the channel of the support rail such that the threaded shaft extends from the channel of the support rail in between the first solar panel frame and the second solar panel frame.

15. The method of clamping at least one solar panel frame to a support rail of claim 14, further comprising:
wherein the mid clamp also comprises a rail portion configured to be situated in between the solar panel frame and the second solar panel frame.

16. The method of clamping at least one solar panel frame to a support rail of claim 13, wherein the deformable toothed washer has a substantially truncated conical shape when in the non-deformed state.

17. The method of clamping at least one solar panel frame to a support rail of claim 13, wherein the deformable toothed washer has a substantially flat shape when in the deformed state.

* * * * *